United States Patent
Hannigan et al.

(10) Patent No.: US 9,679,753 B2
(45) Date of Patent: Jun. 13, 2017

(54) PELTIER-COOLED CRYOGENIC LASER ABLATION CELL

(71) Applicant: UNIVERSITY OF MASSACHUSETTS, Boston, MA (US)

(72) Inventors: Robyn Hannigan, Quincy, MA (US); Thomas Darrah, Wilburton, PA (US); Francesco Peri, West Roxbury, MA (US)

(73) Assignee: UNIVERSITY OF MASSACHUSETTS, Boston, MA (US)

( * ) Notice: Subject to any disclaimer, the term of this patent is extended or adjusted under 35 U.S.C. 154(b) by 0 days.

(21) Appl. No.: 14/774,495

(22) PCT Filed: Mar. 14, 2014

(86) PCT No.: PCT/US2014/028155
§ 371 (c)(1),
(2) Date: Sep. 10, 2015

(87) PCT Pub. No.: WO2014/152898
PCT Pub. Date: Sep. 25, 2014

(65) Prior Publication Data
US 2016/0042932 A1    Feb. 11, 2016

Related U.S. Application Data

(60) Provisional application No. 61/785,602, filed on Mar. 14, 2013.

(51) Int. Cl.
*H01J 37/26*    (2006.01)
*H01J 49/04*    (2006.01)
(Continued)

(52) U.S. Cl.
CPC .......... *H01J 49/0468* (2013.01); *B23K 26/36* (2013.01); *F25B 21/02* (2013.01);
(Continued)

(58) Field of Classification Search
CPC .... H01J 49/0468; H01J 49/0409; B23K 26/36
(Continued)

(56) References Cited

U.S. PATENT DOCUMENTS 5,075,555 A    12/1991    Woldseth et al.
5,616,139 A    4/1997    Okamoto
(Continued)

FOREIGN PATENT DOCUMENTS

ES    2425138 A1    10/2013
JP    H1151904 A    2/1999

OTHER PUBLICATIONS

Zoriy M V et al., "Determination of uranium isotopic ratios in biological samples using laser ablation inductively coupled plasma double focusing sector field mass spectrometry with cooled ablation chamber", International Journal of Mass Spectrometry, Elsevier Science Publishers, Amsterdam, NL, vol. 242, No. 2-3, p. 297-302, Dec. 29, 2004, XP027705270, ISSN: 1387-3806, DOI: 10.1016/j.ijms.2004.10.026. Retrieved Apr. 1, 2005.
(Continued)

*Primary Examiner* — Nicole Ippolito
(74) *Attorney, Agent, or Firm* — Lando & Anastasi, LLP (57) ABSTRACT

Peltier-cooled cryogenic laser ablation cells for sample preparation.

16 Claims, 10 Drawing Sheets

(51) Int. Cl.
 B23K 26/36 (2014.01)
 F25B 21/02 (2006.01)
(52) U.S. Cl.
 CPC ...... H01J 49/0409 (2013.01); H01J 49/0463 (2013.01); *F25B 2321/021* (2013.01); *F25B 2321/0252* (2013.01)
(58) Field of Classification Search
 USPC .................. 250/281, 282, 288, 423 R, 423 P
 See application file for complete search history.

(56) References Cited

U.S. PATENT DOCUMENTS

| | | | |
|---|---|---|---|
| 5,821,175 | A | 10/1998 | Engelsberg |
| 5,841,064 | A | 11/1998 | Maekawa et al. |
| 2002/0170891 | A1 | 11/2002 | Boyle et al. |
| 2006/0014272 | A1 | 1/2006 | Tajima et al. |
| 2006/0096605 | A1* | 5/2006 | Karles ............... A24D 3/0225 131/79 |
| 2012/0104244 | A1* | 5/2012 | Verbeck, IV ............ G01N 1/42 250/282 |
| 2012/0135537 | A1 | 5/2012 | Horton et al. |
| 2013/0192392 | A1* | 8/2013 | Strunk ................ A61B 18/00 73/865.9 |

OTHER PUBLICATIONS

"Kenelec Scientific—Kenelec Products—Sample Chambers", Feb. 10, 2013, XP055308584, Retrieved from the Internet: http://web.archive.org/web/20130210024926/http://www.kenelec.com.au/products/id/976/cid/267/parent/0/t/products/title/Sample Chambers. Retrieved Oct. 7, 2016.

Caren B Les, "Cooling goes cryogenic, Tech Pulse, Apr. 2010, Photonics Spectra", Apr. 2010, XP055307917. Retrieved from the Internet: http://www.photonics.com/Article.aspx?AID=41844. Retrieved Oct. 5, 2016.

Konz Ioana et al, "Design and evaluation of a new Peltier-cooled laser ablation cell with on-sample temperature control", Analytica Chimica Acta, Elsevier, Amsterdam, NL, vol. 809, p. 88-86, Nov. 23, 2013, XP028668821, ISSN: 0003-2670, DOI: 10.1016/J.ACA.2013.11.040.

Thomas Darrah et al, "The Development and Application of Cyrogenic Laser Ablation ICP-MS (CLA-ICP-MS) for Trace Elemental Analysis of Biological Tissues", Geophysical Research Abstracts, Apr. 7, 2011, XP055309910, Viena (Austria). Retrieved from the Internet: http://meetingorganizer.copernicus.org/EGU2011/EGU2011-13128. Retrieved Oct. 12, 2016.

* cited by examiner

| | NIST 612 GLASS | | | | | | PLASTIC PELLET | | | |
|---|---|---|---|---|---|---|---|---|---|---|
| | Standard Cell (Counts/Sec) | % RSD | CryoCell at Room Temp. (24°C) (Counts/Sec) | % RSD | Optimal Temp. (-14°C) (Counts/Sec) | % RSD | | Standard Cell (Counts/Sec) | % RSD | CryoCell at Room Temp. (24°C) (Counts/Sec) | % RSD | Optimal Temp. (-17°C) (Counts/Sec) | % RSD |
| C | 8750 | 4.6 | 16250 | 4.5 | 54600 | 3.8 | C | 478500 | 5.7 | 641500 | 4.7 | 735500 | 4.5 |
| Mg | 2450 | 3.9 | 6750 | 3.7 | 49000 | 3.2 | Mg | 25650 | 4.9 | 34050 | 4.6 | 73850 | 4.5 |
| Al | 10400 | 4.8 | 15800 | 4.2 | 248770 | 3.5 | Al | 2850 | 4.7 | 4700 | 3.7 | 27500 | 3.8 |
| Ca | 19750 | 3.2 | 36700 | 2.9 | 138000 | 3.0 | Ca | 7350 | 4.1 | 12600 | 3.7 | 39000 | 3.8 |
| Mn | 13400 | 4.4 | 18900 | 4.3 | 59000 | 3.9 | Mn | 2275 | 6.3 | 3575 | 6.4 | 11900 | 6.0 |
| Co | 2450 | 4.1 | 5600 | 3.9 | 23200 | 3.4 | Co | 625 | 4.6 | 1200 | 4.6 | 1650 | 4.6 |
| Cu | 2340 | 4.9 | 4200 | 4.1 | 17500 | 4.3 | Cu | 8975 | 5.2 | 18100 | 5.1 | 53700 | 4.7 |
| Sr | 5700 | 3.7 | 8600 | 2.3 | 78000 | 2.8 | Sr | 5200 | 5.3 | 9700 | 5.2 | 31750 | 4.9 |
| Mo | 2450 | 3.4 | 4100 | 3.1 | 18450 | 3.2 | Mo | 550 | 8.2 | 975 | 7.4 | 4350 | 7.1 |
| Sn | 975 | 5.3 | 3400 | 4.9 | 22650 | 4.7 | Sn | 1940 | 6.7 | 3200 | 5.7 | 9300 | 4.9 |
| Cd | 5200 | 3.7 | 11750 | 3.7 | 31570 | 3.8 | Cd | 175 | 9.2 | 375 | 8.4 | 775 | 8.5 |
| Pb | 4575 | 2.9 | 11300 | 2.5 | 23440 | 2.4 | Pb | 850 | 6.8 | 1800 | 6.5 | 4500 | 5.9 |

PELTIER-COOLED CRYOGENIC LASER ABLATION CELL

CROSS-REFERENCE TO RELATED APPLICATIONS

This application is a U.S. National Phase Application under 35 U.S.C. §371 of International PCT Application Serial No. PCT/US2014/028155 filed on Mar. 14, 2014, titled "Peltier-Cooled Cryogenic Laser Ablation Cell," which claims priority to U.S. Provisional Patent Application Ser. No. 61/785,602 titled "Peltier-Cooled Cryogenic Laser Ablation Cell" filed on Mar. 14, 2013 which is hereby incorporated herein by reference in its entirety of all purposes.

FIELD OF THE TECHNOLOGY

One or more aspects relate to laser ablation cells for sample preparation.

BACKGROUND

Laser ablation generally refers to a process of removing material from a sample by irradiating it with a laser. Ablated material may then be entrained in an inert gas for delivery to a sample analyzer.

SUMMARY

In accordance with one or more aspects, a laser ablation cell may be Peltier-cooled to provide cryogenic conditions.

In accordance with one or more aspects, a laser ablation cell may comprise at least one Peltier-cooled stage and a sample surface in communication with the at least one Peltier-cooled stage to promote cryogenic cooling of a sample during laser ablation of the sample.

In accordance with one or more aspects, a sample analysis system may comprise a Peltier-cooled laser ablation sample preparation cell and a sample analyzer fluidly connected downstream of the Peltier-cooled laser ablation sample preparation cell.

In accordance with one or more aspects, a method for sample analysis may comprise ablating a sample in a Peltier-cooled laser ablation cell and delivering ablated sample material to a detector.

Still other aspects, embodiments, and advantages of these exemplary aspects and embodiments are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. The accompanying drawings are included to provide illustration and a further understanding of the various aspects and embodiments, and are incorporated in and constitute a part of this specification. The drawings, together with the remainder of the specification, serve to explain principles and operations of the described and claimed aspects and embodiments.

BRIEF DESCRIPTION OF THE FIGURES

Various aspects of at least one embodiment are discussed below with reference to the accompanying figures. In the figures, which are not intended to be drawn to scale, each identical or nearly identical component that is illustrated in various figures is represented by a like numeral. For purposes of clarity, not every component may be labeled in every drawing. The figures are provided for the purposes of illustration and explanation and are not intended as a definition of the limits of the invention. In the figures.

DETAILED DESCRIPTION

In accordance with one or more embodiments, laser ablation cells may be cryogenically cooled to facilitate sample preparation. A broader range of samples, including biological samples, may be effectively analyzed upon ablation under cryogenic conditions so as to preserve their viability. In at least some embodiments, a laser ablation cell is Peltier-cooled to attain cryogenic conditions. Efficiencies may lead to extended equipment life.

Laser ablation generally involves removing material with a pulsed laser, but ablation can also be performed with a continuous wave laser beam. At lower laser fluxes, a sample is heated by the absorbed laser energy and evaporates or sublimates. At higher laser fluxes, the sample is typically converted to plasma.

The amount of material removed by a single laser pulse depends primarily on a target's optical properties, the laser wavelength, and the pulse length. The total mass ablated from a target per laser pulse is generally referred to as the ablation rate. Laser ablation is particularly valuable for research and industrial applications because laser pulses can be varied over a wide time range and a variety of fluxes can be used, and thus ablation can be precisely controlled. Laser ablation has thus found application in laser machining, nanotechnology, and the manufacture of semiconductors and microprocessors. Laser ablation is also commonly used in dentistry and medicine, and has been used on both benign and malignant tumors in laser-induced interstitial thermotherapy.

In accordance with one or more embodiments, laser ablation may be used to facilitate the analysis of trace elements in samples. A laser ablation cell may be coupled to an elemental analyzer to facilitate sample introduction. An overall analysis system may generally include a laser, such as a 200 nanometer neodymium-doped yttrium aluminum garnet (Nd:YAG, 200) laser, an ablation cell, and a downstream detector. Conventional laser ablation cells are kept at ambient temperature. An ultrapure, inert gas is generally used as a carrier to facilitate flow-through and sample delivery to the detector.

In accordance with one or more non-limiting embodiments, a laser ablation cell may be inductively coupled to a plasma mass spectrometer (ICP-MS) detection system. ICP-MS has grown in popularity due to the ability of the instrument to detect limits at or below the part per trillion (ppt) level across much of the periodic table. ICP-MS has an analytical working range of about nine orders of magnitude and isotopic analysis can be achieved readily. Thus, laser ablation coupled with ICP-MS is a valuable quantitative analytical tool. As a result, ICP-MS, including multicollector, magnetic sector, and quadrupole mass spectrometers, are the detection systems most commonly coupled with laser ablation systems for the analysis of solid samples.

Laser ablation systems may also be coupled to other mass spectrometer platforms. For example, a laser ablation system in accordance with aspects and embodiments may be coupled to a gas-chromatography mass spectrometer (GC-MS). GC-MS enables the delivery of solid particles, the capture of particles within a thermal desorption trap, and analysis of volatiles released upon heating of the trap. In accordance with aspects and embodiments, a laser ablation cell may be coupled to an isotope ratio mass spectrometer (IR-MS). IR-MS detectors support isotropic measurements of elements, for example, hydrogen (H), carbon (C), nitrogen (N), oxygen (O), and sulfur (S), of solid materials. The laser ablation systems disclosed herein may also be inductively coupled to plasma optical emission spectrometers (ICP-OES) and time of flight mass spectrometers (TOF), as well as other suitable detection systems.

In accordance with one or more embodiments, a laser ablation cell may generally include a sample cell defining a chamber for housing a sample or specimen. Sample cell and sample chamber may be used interchangeably herein. The laser ablation cell may also include a lens for focusing an applied laser beam. The lens may be capable of imaging the sample or specimen within the chamber. In some embodiments, the lens may be part of the sample cell. An adjustable platform may be configured to receive the sample or specimen within the chamber. The overall design of the laser ablation cell should generally optimize the energy of the laser beam that intersects the specimen, known as laser fluence, as well as the rate at which ablated material is removed from the cell with a carrier gas, known as washout time.

Washout time is directly related to the carry-over of ablated material to the detection system. After ablation, ablated material travels to a detector where it is ionized for detection. Washout time refers to the time it takes for ablated material to leave the ablation cell. If washout time is slow, ablated material from a previous ablation may mix into the sample stream of a subsequent ablation, reducing precision and accuracy. Slow washout time also causes delays in data acquisition. Improved washout thus reduces background noise, improves data acquisition time, and ensures that no carry over occurs between ablations.

Additional considerations relating to laser ablation cell design include optimization of ablated mass and particle size distribution, referred collectively as laser irradiance. Laser irradiance should generally be consistent across samples of identical matrix and should yield comparative analytical data over time.

Laser ablation industry standards presently involve the use of a sample cell volume of about 35 cm$^3$ and ultrapure helium as a carrier gas. Irradiance for laser ablation should be at least about $3 \times 10^8$ W/cm$^2$. The beam size may, in some embodiments, be about 1 µm to about 1 mm and should maintain irradiance sufficient to induce ablation. For example, a laser of a laser ablation system may deliver about 30 mJ of energy targeting a beam size of about 5 µm to about 100 µm in size.

As a result of laser ablation, a sample or specimen may undergo significant local heating. Such heat may be considered minimal and of negligible concern when analyzing homogenous inorganic materials, such as glass or silicon. Heating is of significant concern, however, when analyzing biological materials.

Laser ablation for ICP-MS is therefore most commonly used for analysis of geological and environmental specimens. For example, laser ablation is commonly used in geological applications to determine the spatial distribution and concentration of elements in small samples. Laser ablation may also be used to analyze biological tissues in accordance with one or more embodiments. In the past, laser ablation ICP-MS has been performed with varying degrees of success on hard biological samples, for example, wood, bones, and shells. A majority of biological samples however are soft and water rich. When ablated, the localized heating that results from ablation causes undesirable changes in such samples and obfuscates significant variations among component concentrations. Thus, in order for laser ablation to be performed on biological samples, the samples may beneficially be kept at cryogenic conditions while ablated. In at least some embodiments, a cryogenic laser ablation cell may maintain subzero surface and cell temperatures during sample preparation.

In accordance with one or more embodiments, a cryogenic laser ablation cell is provided. Cryogenic applications often use expensive and dangerous coolants, such as liquid nitrogen or liquefied propane. In at least some embodiments, the cryogenic laser ablation cells disclosed herein may produce subzero surface and sample chamber conditions without the use of these expensive and dangerous liquids. The presently disclosed cells may greatly simplify operation and reduce costs associated with laser ablation analysis of frozen samples. The disclosed laser ablation cells may find particular utility in facilitating laser ablation of biological materials for analysis.

In accordance with one or more embodiments, Peltier-cooling may offer a safe and robust method to maintain cryogenic conditions at the site of sample collection within a laser ablation cell. The sample may then be delivered to a detector for analysis. In some embodiments, transport efficiency may be enhanced at lower ablation temperatures. At least some embodiments may find applicability within the medical device, oil/gas, nanotechnology, and semiconductor industries. The laser ablation cells and systems disclosed herein may also find applicability within forensic and counterfeit analyses, as well as in the glass, paint, dye, and textile industries.

In accordance with one or more embodiments, Peltier-cooling may maintain cryogenic conditions at the site of sample collection within a laser ablation system. A Peltier-cooled laser ablation cell may be capable of maintaining a temperature of about −20° C. or less at the site of ablation. In at least some embodiments, a Peltier-cooled laser ablation cell may be capable of maintaining a temperature of between about −20° C. and −50° C. at the site of ablation. Analytical signal and signal stability may be enhanced under cryogenic conditions and sample integrity of biological samples may be advantageously retained. In accordance with one or more embodiments, maintaining cryogenic temperatures may beneficially reduce redistribution of soluble analytes within samples during analysis. In at least some embodiments, a cooled surface within an ablation cell may be used to collect materials on a chosen substrate so that they can subsequently be sampled with laser ablation. The performance of chemistry may also be enabled. Other benefits are discussed herein.

Peltier-cooling, also referred to as thermoelectric cooling, generally exploits the Peltier effect to create a heat flux between the junction of two different types of materials. A Peltier cooler is a solid-state active heat pump which transfers heat from one side of a device to the other, with consumption of electrical energy, depending on the direction of the current. A Peltier cooler has two sides, and when current flows through the device, it brings heat from one side to the other, so that one side gets cooler while the other gets hotter. The hot side is generally in communication with a heat sink such that it remains at ambient temperature while the cool side drops below room temperature. Multiple coolers, such as at least first and second stage Peltier coolers, can be cascaded together to produce lower temperatures at the cold side.

A Peltier cooler is generally constructed of two unique semi-conductors, one n-type and one p-type. The semiconductors may be interconnected to create a thermocouple, and thermocouples are electrically connected in series. The thermocouples are sandwiched between two thermally conducting plates. When a voltage is applied to the thermocouple, DC current flows across the device and creates a temperature differential between first and second sides of the cooler. As a result, one plate, the cold side, will be cooled, while the opposite plate, the hot face, will be simultaneously heated. If the heat generated on the hot side is effectively dissipated into heat sinks, the temperature on the cold side may be much lower than the ambient temperature. The cooling capacity of the cooler may generally be proportional to the number of thermocouples in the device and the current passing through it.

In accordance with one or more embodiments, a Peltier-cooled laser ablation cell may include one or more Peltier cooling stages, for example, one, two, three, four, five or more cooling stages. In some non-limiting embodiments, a two-stage Peltier cooled laser ablation cell may be provided to facilitate cryogenic laser ablation of samples. In some embodiments, a first stage cooler may be set to maintain a constant first temperature. A second stage cooler may be in thermal communication with the first stage cooler. The second stage cooler may be associated with an adjustable temperature setting so that the temperature can be adjusted in a range from the first temperature to a second temperature. In some embodiments, the second temperature may be lower than the first temperature.

In accordance with one or more non-limiting embodiments, first stage cooling may be configured to maintain a fixed temperature of, for example, about −20° C. Second stage cooling may be adjustable and controlled to maintain a temperature of, for example, within the range of about −20° C. to about −50° C.

Figure 1:
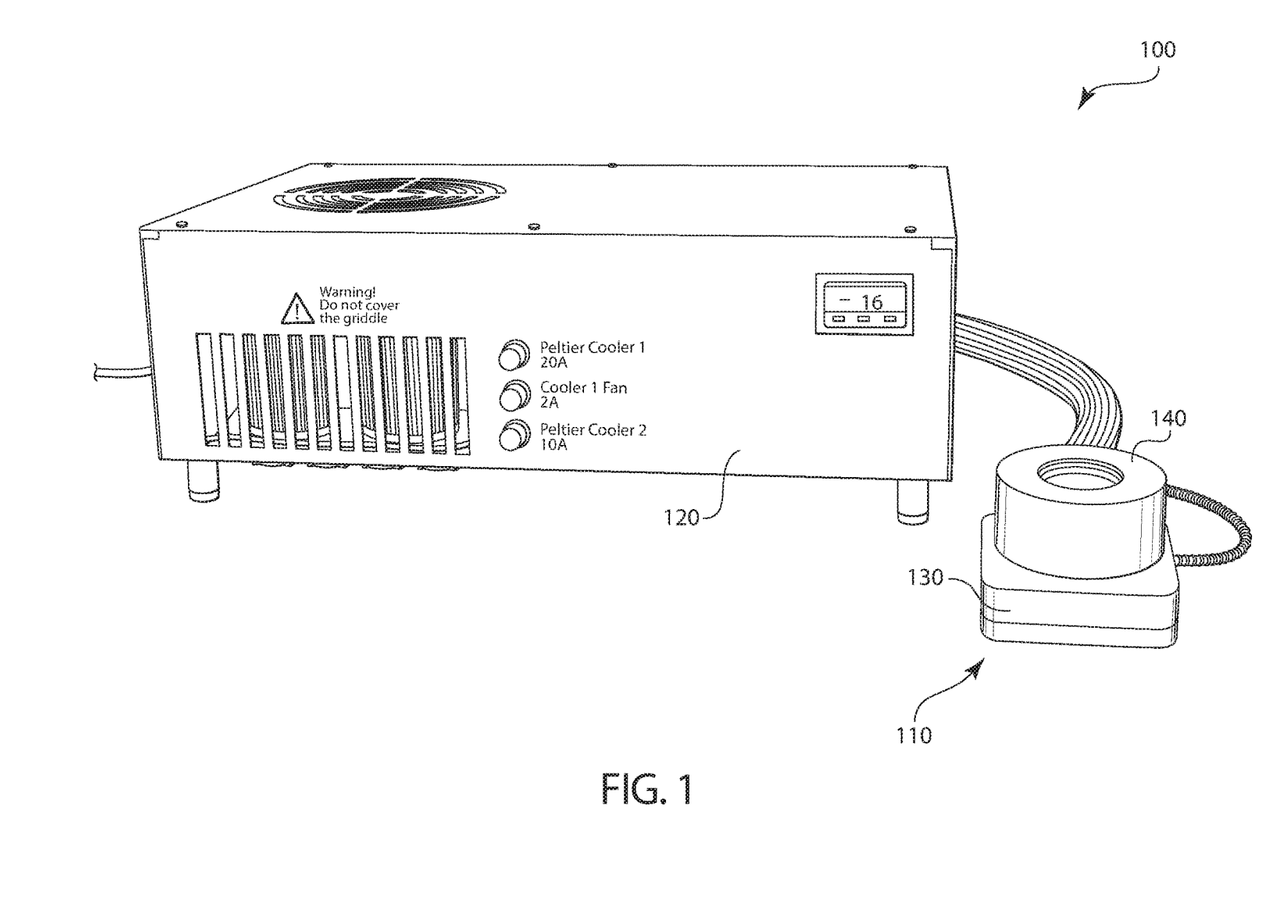
FIG. 1 is a schematic of a laser ablation system in accordance with one or more embodiments.

A laser ablation system 100 showing a laser ablation cell 110 and a control box 120 in accordance with one or more embodiments is presented in FIG. 1. Laser ablation cell 110 may generally include a base 130 and a sample chamber 140. Base 130 may house a second stage Peltier cooler and Peltier temperature regulator as discussed herein. Base 130 and its associated cooling components should generally be configured to promote homogenous cooling of a sample surface. The interface with sample chamber 140 may contribute to this functionality. Sample chamber 140 is configured to receive and hold a sample for laser ablation. Sample chamber 140 may generally include a window to facilitate contact between an applied laser and the sample. Sample chamber 140 is removably receivable by base 130. In some embodiments, base 130 may include a conventional stage mount that is constructed and arranged to accommodate a standard, commercially available sample chamber 140. In at least some embodiments, sample cell 140 may be commercially available from Cetac Technologies, Inc. The footprint of the cryogenic laser ablation cell may be about 30 cm×20 cm×15 cm in some specific non-limiting embodiments.

In some non-limited embodiments, control box 120 may house at least one Peltier cooler (not shown). The at least one Peltier cooler in control box 120, such as a first Peltier cooler as discussed herein, may be thermally connected to at least one Peltier cooler housed in base 130. The at least one Peltier cooler in control box 120 may be thermally connected to the at least one Peliter cooler in base 130 by means of a cooling circuit. The cooling circuit may, for example, be filled with a coolant to facilitate cooling.

Control box 120 may facilitate power management. Each Peltier cooling stage may be associated with a dedicated power supply housed by control box 120. For example, system 100 can include two power supplies for first and second stage Peltier cooling. Each power supply may be independently controlled. A first cooling stage may be associated with an on/off switch to maintain a constant temperature. A second cooling stage may be associated with an adjustable control so that its temperature may be varied. Control box 120 may also house one or more pumps for coolant circulation. In some embodiments, the pump(s) may be relatively low voltage. In some non-limiting embodiments, the pump may be a 24V pump. In other embodiments, the pump may be a 12V pump. In at least some examples, the pumps are centrifugal pumps. The coolant reservoir and pump may be shielded from the thermal coupling associated with the Peltier cooling stages. The electrical system may be regulated by a PID controller. The proportional, integral, and derivative parameters of the PID algorithm for temperature control may be tuned to optimize the electrical system.

In accordance with one or more embodiments, a laser ablation cell may generally be constructed of a material that allows for even heat transfer throughout. In some embodiments, the laser ablation cell may be made of aluminum. In at least some non-limiting embodiments, the aluminum may be shielded with another material, such as copper, and then encased in a thermoplastic such as Delrin® acetal homopolymer (DuPont) to prevent heat transfer to the surroundings.

In accordance with one or more embodiments, a laser ablation cell may be cooled by one or more Peltier cooling stages. Heat may be removed from the hot-side of the at least one Peltier cooler by a liquid-cooled heat exchanger. In some embodiments, the heat exchanger may be a copper liquid-cooled heat exchanger. Liquid coolant may be recycled through the heat exchanger via a closed circuit. A thermocouple may be in contact with the cold side of a Peltier temperature regulator. In accordance with one or more embodiments, a Peltier temperature regulator may sit on top of a cold plate, and may be firmly fitted to remain in full contact. A metal plate or block may be placed on top of the Peltier temperature regulator so as to provide the correct height to receive the sample chamber. In some embodiments, one or more of the Peltier plates of the cooler may be placed in contact with heat blocking gel. The heat blocking gel may reduce condensation so as to protect wiring associated with the Peltier cooler.

A sample cell may be made of plastic in some non-limiting embodiments. The interface between the base and the sample chamber may be sealed with an o-ring. A cold Peltier stage may be covered with Teflon® (DuPont) or like material at the interface with the sample cell. Gas inlet and outlet ports of the sample cell may be configured to facilitate flow of ablated materials from the cell to an analytical instrument. Fluence and irradiance may be maintained and the cell may be used across laser ablation platforms.

Figure 2:
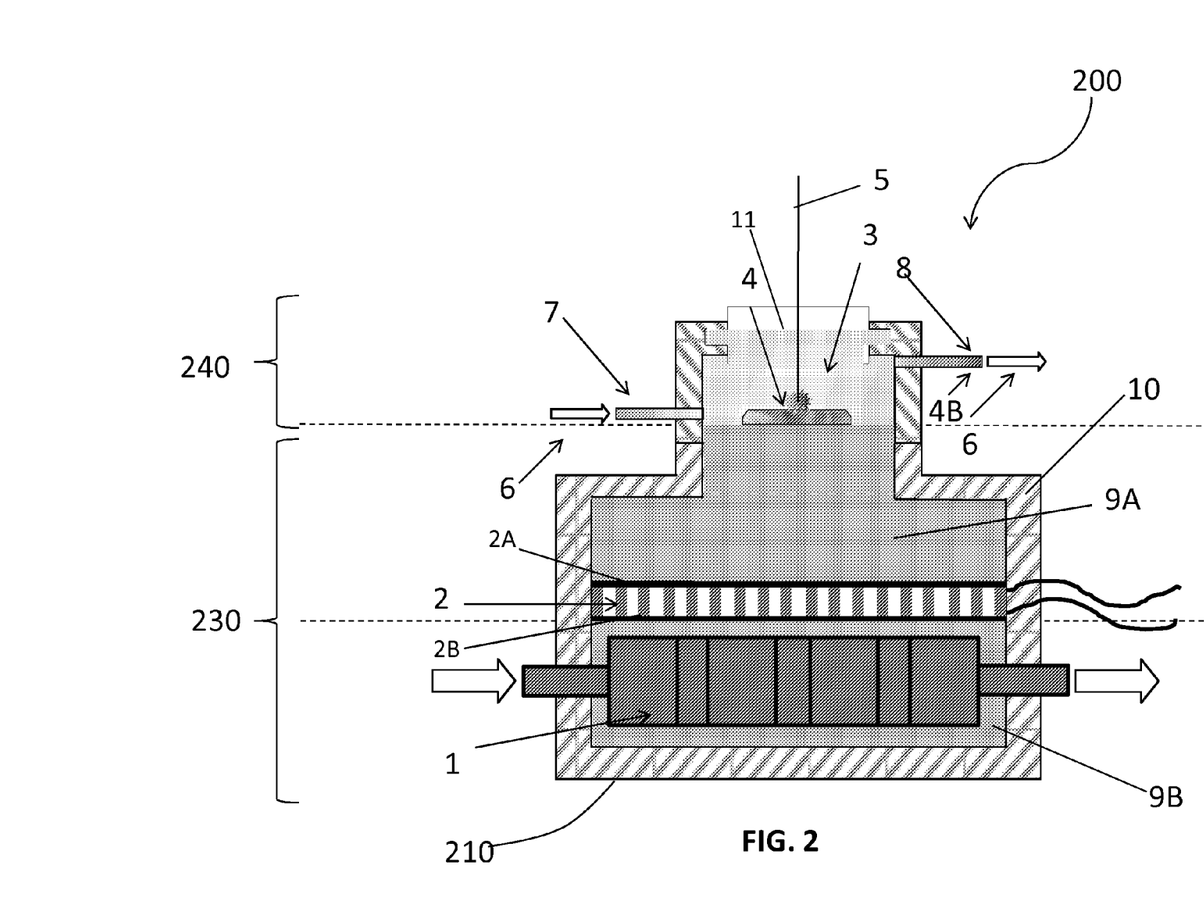
FIG. 2 is a schematic of a Peltier-cooled laser ablation cell in accordance with one or more embodiments.

With reference to FIG. 2 a cryogenic laser ablation system 200 may have cryogenic laser ablation cell 210. Cryogenic laser ablation cell 210 may include sample chamber 240 and base 230. Base 230 may include a plurality of stages of Peltier cooling, or may, for example, involve a single stage of Peltier cooling. A Peltier cooling stage housed in base 230 may be in communication with another Peltier cooling stage located outside of ablation cell 210. A first stage Peltier cooler may, for example, be located in a control box (not shown) and in thermal communication with a Stage 2 Peltier cooler located within base 230, shown as Peltier cooler 2. The first stage Peltier cooler may be thermally connected to the second stage Peltier cooler by a closed loop cooling circuit (not shown). The circuit may include a pump, an expansion reservoir, and flexible tubing that circulates a coolant.

Peltier cooler 2 is positioned between blocks 9A and 9B. In accordance with some embodiments, block 9A and block 9B may comprise, consist, or consist essentially of the same material, or may, for example, comprise, consist, or consist essentially of different materials. In a preferred embodiment, blocks 9A and 9B are constructed of a material capable of facilitating heat transfer, and may, for example, be constructed of aluminum. Copper foil and/or high density polysynthetic silver thermal compound (not shown) may be positioned between the plate 2A and block 9A and plate 2B and block 9B to further facilitate heat transfer. Cell 200 may be encased in a thermally insulating layer 10. The thermally insulating layer, may, for example, consist of Delrin®. Thermal insulation 10 ensures that there is no exchange of heat with the cell surroundings. Thermal insulation 10 further ensures that no air enters the cell and thus prevents condensation of water vapor present in the air. The cell is hermetically sealed from the outside environment by two O-ring gaskets.

Peltier cooler 2 has plate 2A and plate 2B. During cooling, plate 2A functions as the cold side and plate 2B functions as the hot side. Plates 2A and 2B must be thermally insulated from one another. In accordance with some embodiments, a heat blocking gel, such as dielectric grease, is used to fill any gaps between plates 2A and 2B. Absent a heat blocking gel, the presence of moisture in the air and the low temperature of the cold plate may cause condensation in the Peltier cooler. Condensation in the Peltier cooler may cause dielectric failure and burnout of the cooler. Thus, by filling any gaps with a heat blocking gel, the formation of condensation is reduced and the system is enhanced.

Peltier cooler 2 is positioned above heat exchanger 1. Heat exchanger 1 circulates coolant fluid that extracts heat from hot side plate 2B. In accordance with various embodiments, the first stage Peltier cooler may maintain the coolant in heat exchanger 1 at a fixed temperature. In some embodiments, the first stage Peltier cooler may maintain the coolant fluid in heat exchanger 1 at about −20° C. The heat exchanger in turn maintains the hot side, plate 2B, of Peltier cooler 2 at about the same temperature as the coolant. When the coolant circulating through heat exchanger 2 is maintained at about −20° C., plate 2A may be regulated down to, for example, about −50° C.

The second stage Peltier cooler 2 may generally be positioned so as to enable homogenous cooling across the surface of a sample. Block 9A is in thermal communication with plate 2B, and thus is cooled to the temperature of 2B. Sample 4 is placed in sample space 240 and in thermal communication with block 9A. A lens (not shown) is positioned in window 10. In operation, laser 5 is focused through the lens and ablates sample 4. Helium gas 6 enters through port 7 and carries ablated material 4B out of the cell through port 8. Ablated material 4B in helium stream 6 is carried to a downstream detector (not shown). Sample chamber 240 is cooled via the first and second Peltier stages.

Figure 3:
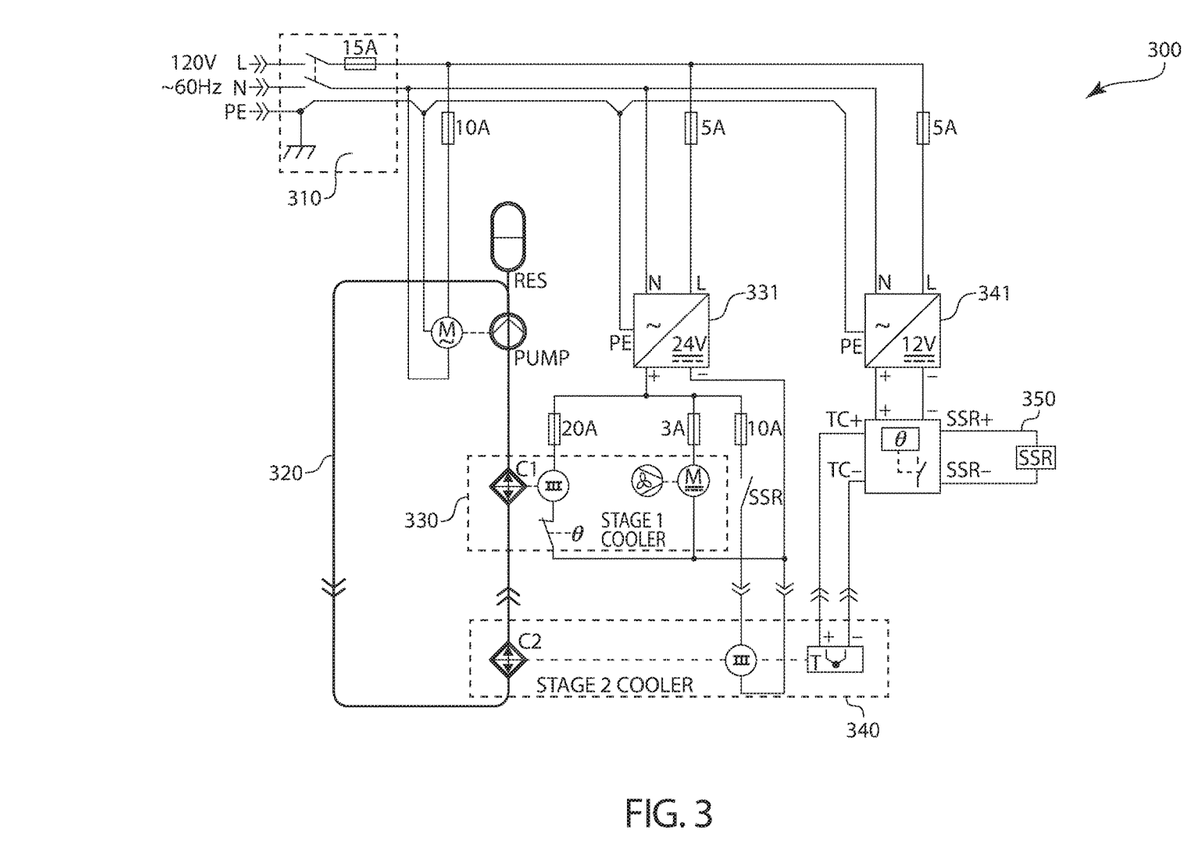
FIG. 3 is a wiring schematic of a Peltier-cooled laser ablation system in accordance with one or more embodiments.

The first and second stage Peltier coolers may be coupled to at least one power supply through electrical interconnects. The electrical system may be controlled by a PID controller, which may be tuned to optimize electrical performance. In accordance with aspects and embodiments, system 300 of FIG. 3 presents a non-limiting diagram of an electrical schematic for a two-stage Peltier cooled laser ablation cell. A power entry module 310, which may be fused or otherwise protected from overload current, may be provided with grounding connected to the chassis of the control box. Individual branches of the power distribution to different devices may also be fused or otherwise protected from overload current. A 24V power supply 331 may provide power to first cooling stage 330 and second cooling stage 340. Stage 1 may comprise a fan cooled heat exchanger and a Peltier cooler. Stage 2 may comprise a Peltier cooler and a thermocouple for closed-loop temperature control. A second 12V power supply 341 may provide power for a temperature controller and operate the stage 2 cooler via a solid state relay (SSR). A cooling circuit 320 may consist of a centrifugal pump and 2 heat exchangers, one heat exchanger in stage 1 and one heat exchanger in stage 2, to provide a thermal connection between the two cooling stages.

In accordance with one or more embodiments, a cryogenic laser ablation cell may provide an enhanced signal to noise ratio compared to conventional cells and thus be capable of achieving better sampling across a wide range of temperatures, including ambient and cryogenic temperatures. The sample chamber geometry, location of the port that delivers carrier gas, and location of a sample exit may promote an improved flow of carrier gas. By reducing the height of the sample chamber and optimizing the carrier gas port and sample exit port, a carrier gas stream may, for example, be substantially laminar across a sample ablation surface. Laminar flow across the sample ablation surface allows for higher entrainment of sample, which increases the signal of detection and increases the ratio of sample signal to background signal. The signal to noise ratio at ambient conditions for a given isotope may be, for example, about 0.8. The signal to noise ratio for the same isotope under identical ablation conditions and under cryogenic temperature may, for example, be about 2.5. Thus, the signal to noise ratio may be enhanced by more than about four times the signal to noise ratio obtained under ambient conditions. The laser ablation cells in accordance with one or more embodiments therefore enable the detection of lower concentrations of various elements of interest.

Spot size in laser ablation is directly proportional to detected signal. Of the material ablated by commercial laser ablation systems (Nd:YAG), only 10% of the material ablated is ionized in the plasma of an ICP-MS and as a result, little of the total sample is quantified. Therefore, if more material can be delivered to the detector, the sample can be better analyzed. For most matrices, spot sizes below 20 µm do not yield sufficient material to detect analytes at concentrations below high parts-per-billion. Often, the region of interest for analysis is quite small. Working with a spot size larger than the region of interest may result in ablating material that is not of interest. By increasing the signal to noise ratio under cryogenic conditions, it is possible to reduce the spot size while still maintaining detection capabilities. This advantageously facilitates analysis at smaller spatial scales. The cryogenic laser ablation cells of the present disclosure may, for example, facilitate analysis of specimens less than about 1 mm in size.

Cryogenic conditions may also facilitate better coupling of the laser to a sample and thus may improve analysis. Generally, laser energy is manipulated to optimize the coupling of the laser with the sample matrix. However, a reduction of laser energy also reduces the amount of material ablated, which may inhibit detection. Laser energy may however be reduced at lower temperatures while still maintaining an adequate detection signal. Thus, because detection is enhanced at lower temperatures, it is possible to maintain an adequate detection signal at lower laser energies optimal for certain matrices.

In accordance with one or more embodiments, a Peltier-cooled laser ablation cell may enable the reduction of ablation spot size and the analysis of small specimens. In at least some embodiments, a sample may be less than about 1 mm in dimension and still be successfully analyzed. Ablating material at colder temperatures may generally increase the ablation yield. Spot size may be inversely related to ablation yield, and by ablating at lower temperatures, sample spot size can thus be reduced. By reducing spot size, a higher spatial resolution may also be obtained.

Figure 4:
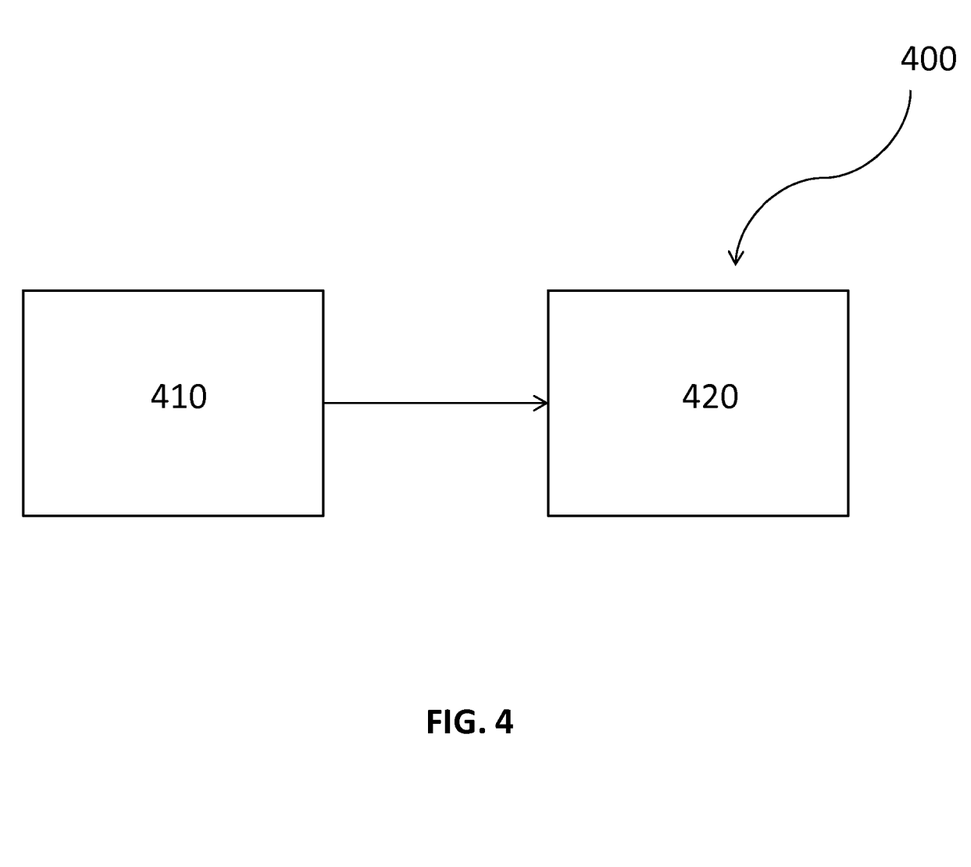
FIG. 4 is a schematic of a sample analysis system in accordance with one or more embodiments.

In accordance with one or more embodiments, a cryogenic laser ablation cell may be coupled with a detection system. The detection system, may, for example, be an induction coupled mass spectrometer (ICP-MS). With reference to system 400 in FIG. 4, Peltier-cooled laser ablation cell 410 is in fluid communication with ICP-MS 420. Ablated material is carried from ablation cell 410 via a carrier gas to ICP-MS 420 for analysis.

In accordance with one or more embodiments, the laser ablation cell may be compatible with laser platforms that are not closed-cased, thus open-cased. The control system may be positioned to the side or top of the laser ablation unit so as to not obstruct access to the sample chamber. In accordance with one or more embodiments, a footprint of a laser ablation cell may fit within a standard laser ablation system housing.

In accordance with one or more embodiments, a conventional laser ablation cell for sample preparation may be retrofitted for cryogenic cooling. In some embodiments, a standard sample cell may be received by a modified base. The modified base may include one or more Peltier-cooled stages. In at least some embodiments, a Peltier regulated cold plate may fit into a conventional base mount so as to accommodate a manufacturer's standard sample chamber. In other embodiments, a sample chamber may be modified so that it can attach to a modified base.

In accordance with one or more embodiments, a method of sample preparation is provided. A sample may be placed in a sample chamber of a Peltier-cooled cryogenic laser ablation cell. The sample is ablated via a laser and then entrained in a carrier gas for further processing. The laser ablation parameters are controlled by laser ablation software. The laser ablation software is generally provided by the manufacturer of the laser ablation unit. A user may control the temperature of the sample cell via an interface of the cryogenic cell. In accordance with some embodiments, manufacturer provided laser ablation software may be modified to control the temperature of the sample.

In accordance with one or more embodiments, a method of sample analysis is provided. A sample may be placed in the sample chamber of a Peltier-cooled cryogenic laser ablation cell. The sample is ablated via laser, and ablated material is delivered to an analyzer, such as an ICP-MS, for analysis. Ablated material enters the Argon plasma of the ICP-MS under high vacuum where it is ionized. Charged ions are formed and then focused through 2 sets of cones. The ions are then, via a voltage lens, delivered to quadrupole mass filters which further separate the ions by their mass. The ions are then detected as voltage readings by a 21 dynode cascading array detector that multiplies the voltage signal. The signal is then converted to counts, the number of times a voltage was detected over a second of acquisition. The data are then used by the analyst to quantify the concentrations of the analytes of interest.

In biological samples, such as shell, bone, tendon, and other tissues, there are often two or more matrices or phases present. For example, bone and shells have two matrices, inorganic material and organic material. These two matrices couple with the laser differently. Under normal, ambient, conditions, the ablation laser will couple best with the inorganic phase and may not couple efficiently with the organic components. The laser may "burn" the organic components. Inefficient coupling can reduce the quality of data obtained. In accordance with aspects and embodiments, a cryogenic cell enables laser ablation of materials at different temperatures, which facilitates optimization of ablation of multiple matrices within a single sample.

The function and advantages of these and other embodiments will be more fully understood from the following examples. The examples are intended to be illustrative in nature and are not to be considered as limiting the scope of the embodiments discussed herein.

EXAMPLE 1

Figure 5:
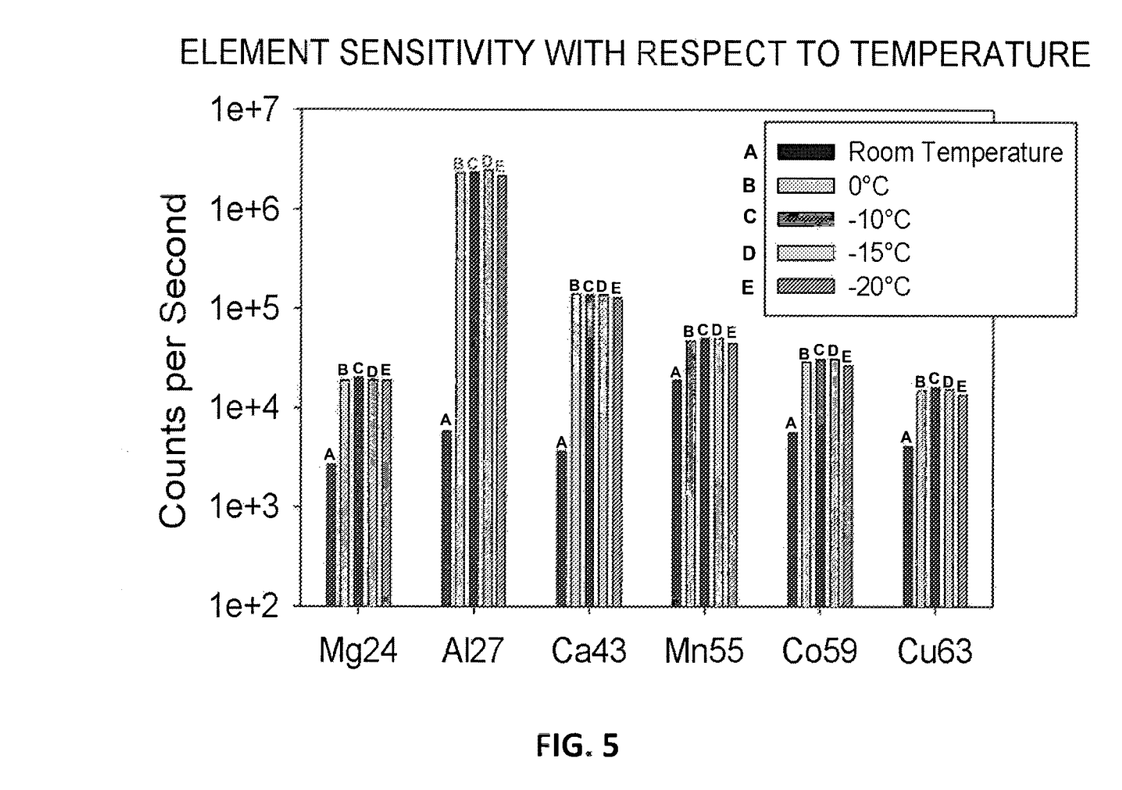
FIG. 5 presents experimental data illustrating element sensitivity with respect to temperature in accordance with one or more embodiments.

Experiments were conducted to confirm that the analytical signal and signal stability are greatly enhanced under the cryogenic conditions provided by a Peltier-cooled laser ablation cell. To analyze signal intensity in response to temperature change, NIST 612 glass was used as a sample specimen. The specimen was ablated and analyzed by ICP-MS at a variety of temperatures. The collected data is presented in FIG. 5. Each of the elements analyzed demonstrated higher signal intensity, quantified by counts per second, as temperature decreased. The data demonstrated that signal intensity increased with decreasing temperature until an optimal temperature was reached according to the sample matrix. The adjustable second stage cooling of the two-stage Peltier-cooled laser ablation cell enabled single degree temperature control to maximize analytical precision and reduce analytical error.

EXAMPLE 2

Figure 6:
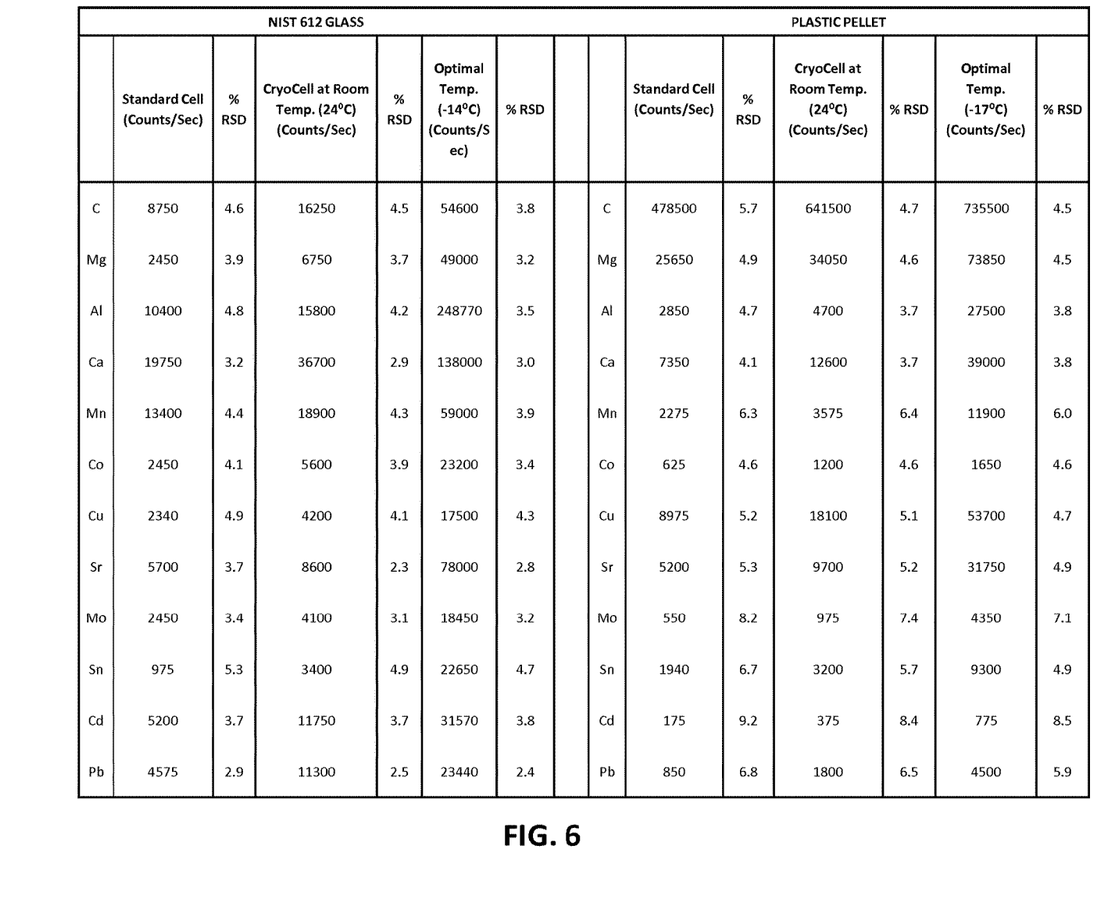
FIG. 6 presents experimental data illustrating the relative sensitivities of NIST 612 Glass and a Plastic Pellet Standard using both a commercially available laser ablation cell and a Peltier-cooled laser ablation cell in accordance with one or more embodiments.

Sensitivity was further investigated by using NIST 612 Glass and Plastic Pellet Standard measures using both a commercially available laser ablation cell and the Peltier-cooled cell disclosed herein. The height of the sample chamber of the Peltier-cooled cell was reduced as compared to the commercially available cell, and the carrier gas and sample outlet ports were aligned to achieve optimal sample entrainment. The data, shown in FIG. 6, shows significantly lower signal intensities for the standard cell for both the NIST 612 Glass and the Plastic Pellet. Signal intensities increased when the Peltier-cooled cell was used at room temperature, which demonstrated that the cell design improved signal intensity over commercially available cells. The temperature was then reduced and optimized for each standard measure. The NIST 612 Glass produced the highest signal intensity at a temperature of about −14° C. and the Plastic Pellet produced the highest signal intensity at a temperature of about −17° C. These results demonstrate that even non-biological samples benefit from analysis under cryogenic conditions as enabled by the present laser ablation cell design.

In each experiment, 10 sweeps were performed three times under the same laser parameters and the mean was reported. In each instance, the relative standard deviation fell within acceptable parameters.

EXAMPLE 3

Figure 7:
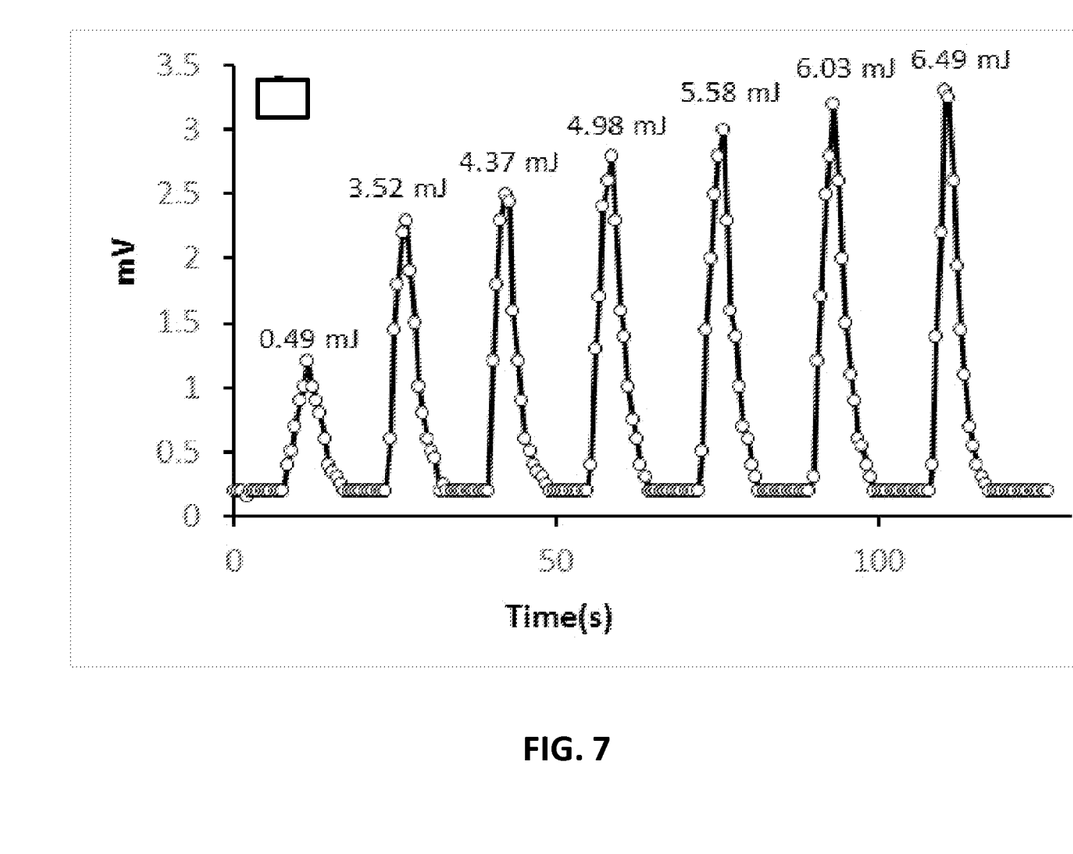
FIG. 7 presents experimental data illustrating laser energy versus sample energy in accordance with one or more embodiments.

Biological samples were then investigated by laser ablation with and without cryogenic cooling. A 213 nm laser ablation unit was coupled to an ICP-MS. In order to confirm that the energy provided by the laser and thus transmitted to the sample was not being compromised by cryogenic conditions, a brain tissue specimen was analyzed at about −20° C. The data, shown in FIG. 7, demonstrates that as laser voltage increased, a comparable increase in energy was transmitted to the sample. These results confirmed that the cryogenic conditions did not interfere with the ablation energy transmitted to the specimen.

EXAMPLE 4

Figure 8A:
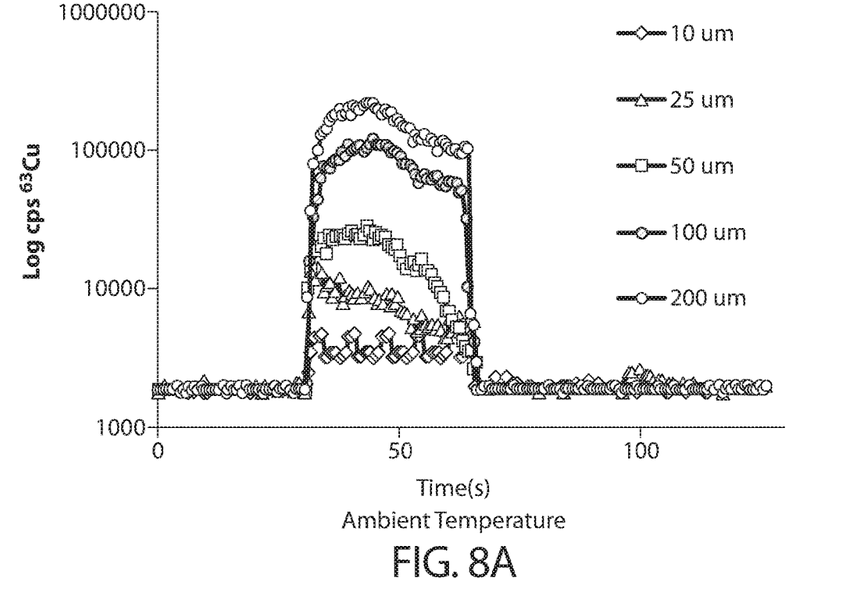
FIGS. 8A-8C present experimental data concerning sample spot size and intensity under both ambient and cryogenic conditions in accordance with one or more embodiments.
Figure 8B:
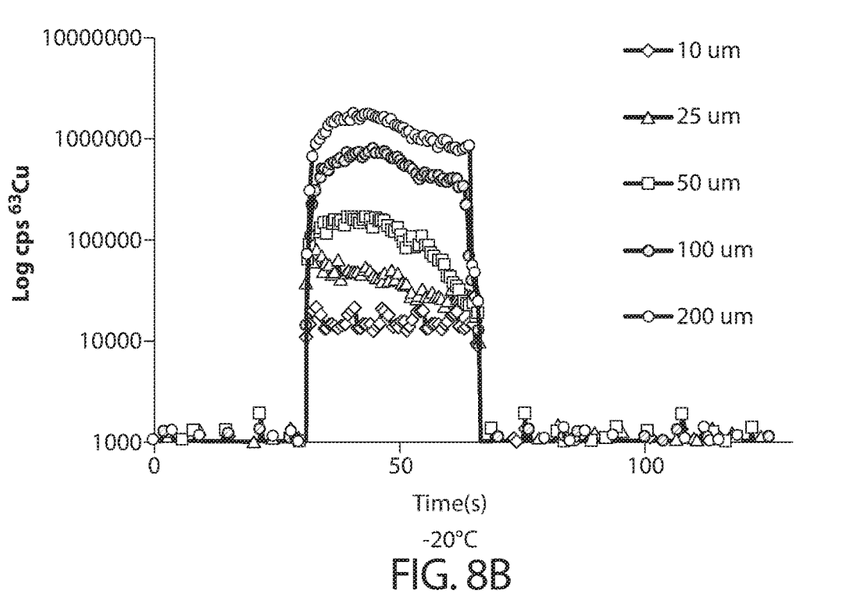
Figure 8C:
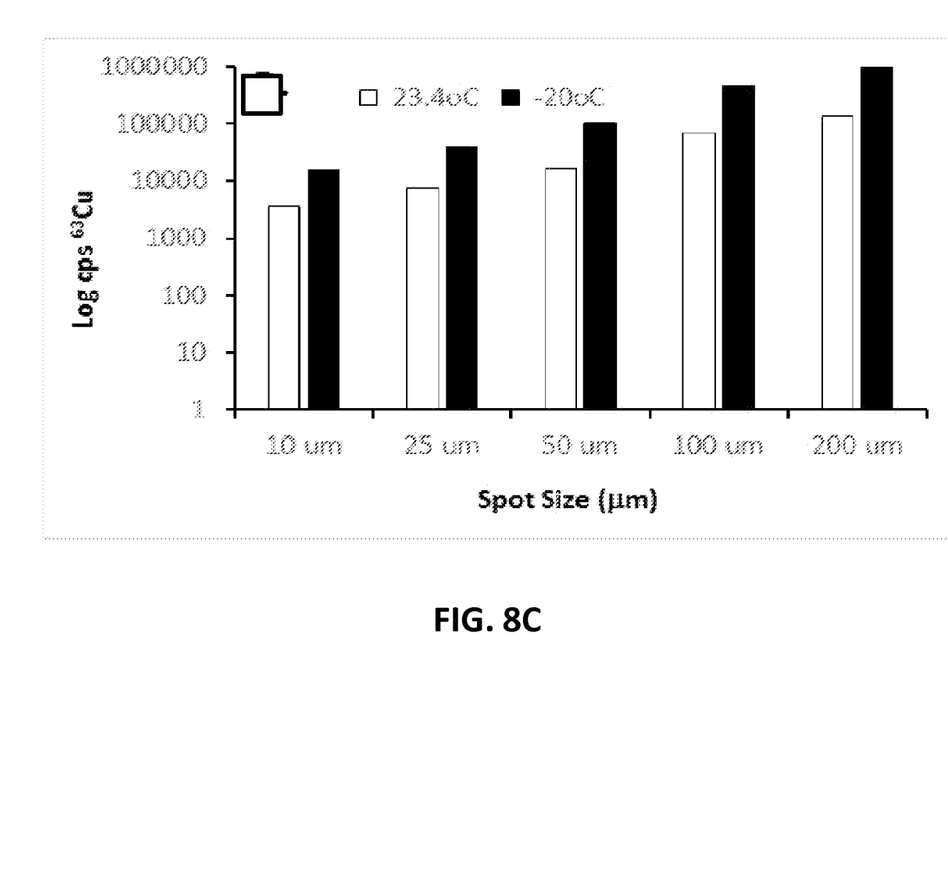

The effect of spot size and temperature were then investigated by using a NIST 612 glass specimen and monitoring $^{63}Cu$ at different spot sizes, first under ambient temperature, and then at −20° C. The log counts per second of $^{63}Cu$ were measured at 10 μm, 25 μm, 50 μm, 100 μm, and 200 μm, each at 100% laser energy, 10 Hz, 100 shots. The data presented in FIGS. 8A and 8B show that signal intensity greatly increased when analyzed under cryogenic conditions. The results are synthesized in a single graph presented as FIG. 8C. The data demonstrates that cooling increases ablation yield by about 400% to about 800%. Spot size can therefore be reduced, and better special resolution can be achieved. The laser energy used for ablation is optimized, during analysis, to ensure optimal coupling of the laser with the sample while maintaining the ablation geometry of the system (flat bottomed craters). Some matrices require less energy to maintain their integrity when ablated and as a result this means, under room temperature conditions, that less material is ablated and the detection limit is increased. Under cryogenic conditions it is possible to maintain or enhance laser coupling with higher energy so that more material is ablated but the sample integrity and ablation quality are maintained and lower concentrations of materials can be detected.

EXAMPLE 5

Figure 9:
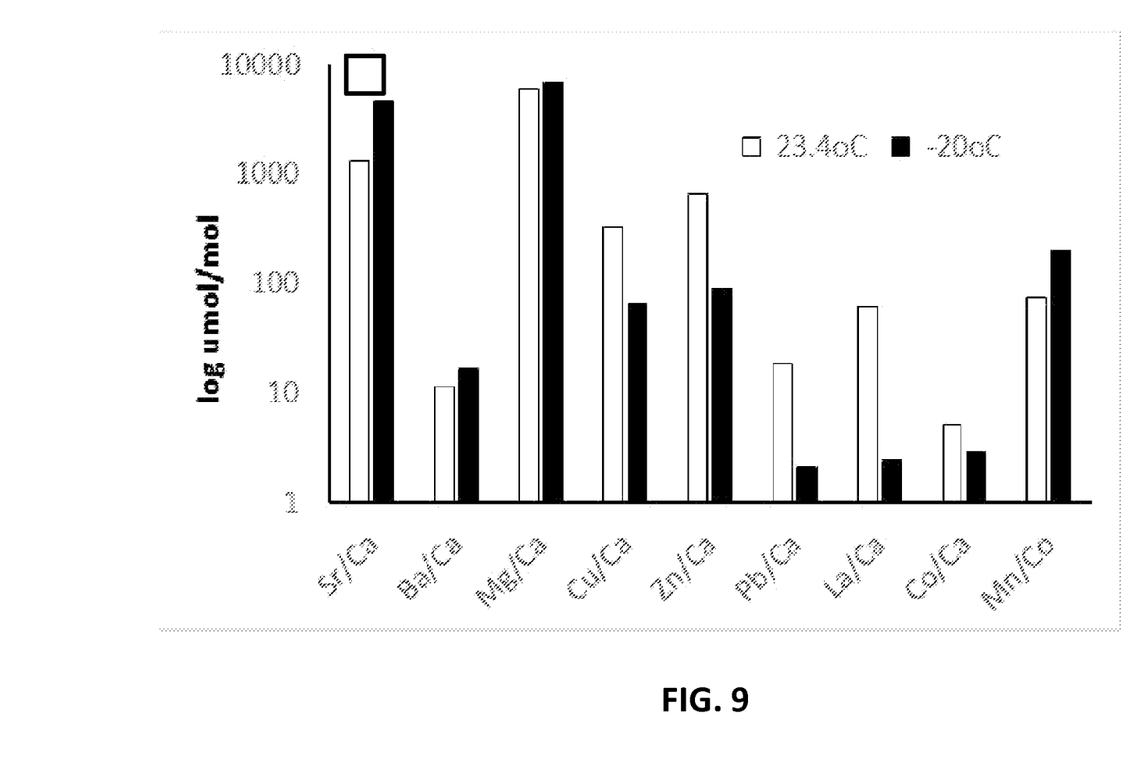
FIG. 9 presents experimental data collected via laser ablation of mussel shell under both ambient and cryogenic conditions in accordance with one or more embodiments.

The signal enhancement provided by cooling for analysis of carbonate samples and biomineral specimens was investigated by sampling a mussel shell. The ratio of metal concentrations to calcium was measured at ambient temperature and at −20° C. The laser was at 75% energy, 10 Hz, 50 shots. Mussel shells comprise a combination of inorganic carbonate and protein and are thus a very complex matrix. Under ambient conditions, the laser generally obfuscates the organic material (proteins) and the results obtained are therefore less accurate. The data, shown in FIG. 9, demonstrates enhancement of signal provided by cooling for elements in certain phases. The determination of elements in different phases is enabled by the ability to vary ablation temperature.

EXAMPLE 6

A cryogenic laser ablation cell in accordance with aspects and embodiments was used to analyze *Xenopus* oocytes and eggs at 17° C. The oocyte and egg animal pole and vegetal pole were ablated using a 50 μm spot. This spot size allowed multiple ablations on the same pole without affecting total cellular integrity. Calcium (Ca), manganese (Mn), copper (Cu), zinc (Zn), and lead (Pb) concentrations were measured. Zn-66 was used as an internal standard for these experiments.

EXAMPLE 7

Laser ablation ICP-MS of an archeological specimen of human bone was performed at 15° C. The biogenic zone and the diagentically altered zone of the sample were analyzed. The results showed the differing lead concentrations in the different regions of the bone.

EXAMPLE 8

Laser ablation ICP-MS was performed on isolated metalloproteins placed on a gel membrane. Spot ablation at 50 μm was performed on each protein sample. Using this approach, it was possible to identify what metal activated the proteins.

Having now described some illustrative embodiments, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention. In particular, although many of the examples presented herein involve specific combinations of method acts or system elements, it should be understood that those acts and those elements may be combined in other ways to accomplish the same objectives.

It is to be appreciated that embodiments of the devices, systems and methods discussed herein are not limited in application to the details of construction and the arrangement of components set forth in the following description or illustrated in the accompanying drawings. The devices, systems and methods are capable of implementation in other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiments.

Those skilled in the art should appreciate that the parameters and configurations described herein are exemplary and that actual parameters and/or configurations will depend on the specific application in which the systems and techniques of the invention are used. Those skilled in the art should also recognize or be able to ascertain, using no more than routine experimentation, equivalents to the specific embodiments of the invention. It is therefore to be understood that the embodiments described herein are presented by way of example only and that, within the scope of the appended claims and equivalents thereto; the invention may be practiced otherwise than as specifically described.

Moreover, it should also be appreciated that the invention is directed to each feature, system, subsystem, or technique described herein and any combination of two or more features, systems, subsystems, or techniques described herein and any combination of two or more features, systems, subsystems, and/or methods, if such features, systems, subsystems, and techniques are not mutually inconsistent, is considered to be within the scope of the invention as embodied in the claims. Further, acts, elements, and features discussed only in connection with one embodiment are not intended to be excluded from a similar role in other embodiments.

The phraseology and terminology used herein is for the purpose of description and should not be regarded as limiting. As used herein, the term "plurality" refers to two or more items or components. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to the claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:

1. A laser ablation cell, comprising:
   a first Peltier cooler;
   a second Peltier cooler;
   a first controller configured to maintain the first Peltier cooler at a first temperature;
   a second controller configured to adjust the second Peltier cooler over a temperature range from the first temperature to a second temperature; and
   a sample surface in thermal communication with at least one of the first Peltier cooler and the second Peltier cooler to promote cryogenic cooling of a sample during laser ablation of the sample.

2. The laser ablation cell of claim 1, wherein at least one of the first Peltier cooler and the second Peltier cooler is configured to cool the sample to a temperature of less than about −20° C.

3. The laser ablation cell of claim 1, further comprising an inlet fluidly connected to a source of an inert carrier gas.

4. The laser ablation cell of claim 3, wherein the inert carrier gas comprises helium.

5. The laser ablation cell of claim 3, wherein the cell is configured to promote laminar flow of the inert carrier gas across the sample surface.

6. The laser ablation cell of claim 1, further comprising a 12V pump in communication with at least one of the first Peltier cooler and the second Peltier cooler.

7. The laser ablation cell of claim 1, further comprising a heat blocking gel applied to at least one of the first Peltier cooler and the second Peltier cooler.

8. The laser ablation cell of claim 1, wherein the first Peltier cooler and the second Peltier cooler are connected by a cooling circuit.

9. The laser ablation cell of claim 1, wherein the first Peltier cooler and the second Peltier cooler are cascaded.

10. A sample analysis system, comprising:
    a Peltier-cooled laser ablation sample preparation cell comprising:
      a first Peltier-cooled stage;
      a second Peltier-cooled stage;
      a first controller configured to maintain the first Peltier-cooled stage at a first temperature;
      a second controller configured to adjust the second Peltier-cooled stage over a temperature range from the first temperature to a second temperature; and
      a sample surface in thermal communication with at least one of the first and second Peltier-cooled stages to promote cryogenic cooling of a biological sample during laser ablation of the biological sample; and
    a biological sample analyzer fluidly connected downstream of the Peltier-cooled laser ablation sample preparation cell.

11. The system of claim 10, wherein the analyzer comprises an inductively coupled plasma mass spectrometer (ICP-MS).

12. The laser ablation cell of claim 10, wherein the first Peltier-cooled stage and the second Peltier-cooled stage are connected by a cooling circuit.

13. The laser ablation cell of claim 10, wherein the first Peltier-cooled stage and the second Peltier-cooled stage are cascaded.

14. A method for sample analysis, comprising:
    ablating a biological sample in a Peltier-cooled laser ablation cell having a first Peltier-cooled stage and a second Peltier-cooled stage; and
    delivering ablated biological sample material to a detector.

15. The method of claim 14, wherein the detector comprises an inductively coupled plasma mass spectrometer (ICP-MS).

16. The method of claim 14, further comprising adjusting a temperature of the second Peltier-cooled stage to facilitate phase analysis of the biological sample.

* * * * *